US009971333B2

(12) United States Patent
Wang

(10) Patent No.: US 9,971,333 B2
(45) Date of Patent: May 15, 2018

(54) PROGRAMMING AUXILIARY SYSTEM OF PROGRAMMABLE CONTROLLER AND METHOD THEREOF

(71) Applicant: SCHNEIDER ELECTRIC INDUSTRIES SAS, Rueil-Malmaison (FR)

(72) Inventor: Haifeng Wang, Shanghai (CN)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 248 days.

(21) Appl. No.: 14/655,834

(22) PCT Filed: Dec. 23, 2013

(86) PCT No.: PCT/CN2013/090259
§ 371 (c)(1),
(2) Date: Jun. 26, 2015

(87) PCT Pub. No.: WO2014/101736
PCT Pub. Date: Jul. 3, 2014

(65) Prior Publication Data
US 2015/0331406 A1   Nov. 19, 2015

(30) Foreign Application Priority Data
Dec. 31, 2012   (CN) .......................... 2012 1 0592712

(51) Int. Cl.
*G06F 15/16* (2006.01)
*G05B 19/05* (2006.01)
*H04L 29/06* (2006.01)

(52) U.S. Cl.
CPC ............ *G05B 19/056* (2013.01); *H04L 67/42* (2013.01); *G05B 2219/13004* (2013.01);
(Continued)

(58) Field of Classification Search
CPC ........ G05B 19/056; G05B 2219/13004; G05B 2219/14124; G05B 2219/15038; G05B 2219/23304; H04L 67/42
(Continued)

(56) References Cited

U.S. PATENT DOCUMENTS 6,151,609 A     11/2000  Truong
6,853,867 B1 *   2/2005  Klindt .................. G05B 19/056
                                                             700/67
(Continued)

FOREIGN PATENT DOCUMENTS

CN         1226709 A      8/1999
CN         1409233 A      4/2003
(Continued)

OTHER PUBLICATIONS

Extended European Search Report from corresponding European Application No. 13869115.9 dated Jan. 20, 2016.
(Continued)

*Primary Examiner* — Wing F Chan
*Assistant Examiner* — Joseph Maniwang
(74) *Attorney, Agent, or Firm* — Lando & Anastasi, LLP

(57) ABSTRACT

A PLC programming auxiliary system and a method thereof are provided. The system comprises: a web server providing a complex algorithm for programming PLC, correctness checking of the programming and user logic compilation functions; a plurality of client computers connecting with a web server and the programmed PLC devices via a network link. When a client computer is linked to the website server by a user, a web browser on the client computer requests from the web server to download client programming software for programming an appropriate PLC device, and the client programming software for programming the appropriate PLC device is executed within the web browser on the
(Continued)

client computer, to enable the client computer to configure the PLC device and program the user logic through the client programming software for programming the appropriate PLC device, and the client computer implements an interface connection and an interaction operation of the web server with the user through the client programming software for programming the appropriate PLC device.

8 Claims, 4 Drawing Sheets

(52) U.S. Cl.
CPC .............. *G05B 2219/14124* (2013.01); *G05B 2219/15038* (2013.01); *G05B 2219/23304* (2013.01)

(58) Field of Classification Search
USPC ......................................... 709/203, 219–221
See application file for complete search history.

(56) References Cited

U.S. PATENT DOCUMENTS

| | | | | |
|---|---|---|---|---|
| 7,035,898 | B1* | 4/2006 | Baker ................... | G05B 19/05 700/83 |
| 7,058,693 | B1* | 6/2006 | Baker, Jr. ............. | H04L 67/025 700/17 |
| 7,904,181 | B2 | 3/2011 | Aupperlee et al. | |
| 2003/0061311 | A1* | 3/2003 | Lo ....................... | G05B 19/0426 709/220 |
| 2004/0153594 | A1 | 8/2004 | Rotvold et al. | |
| 2008/0133789 | A1 | 6/2008 | McNutt et al. | |
| 2008/0168086 | A1 | 7/2008 | Miller et al. | |
| 2011/0289486 | A1* | 11/2011 | Revinskaya .......... | G06F 11/076 717/129 |

FOREIGN PATENT DOCUMENTS

| | | |
|---|---|---|
| CN | 1901671 A | 1/2007 |
| CN | 201804245 U | 4/2011 |
| CN | 102081393 A | 6/2011 |
| CN | 102393858 A | 3/2012 |
| EP | 0917052 A1 | 5/1999 |
| EP | 1296232 A2 | 3/2003 |
| RU | 2345409 C2 | 1/2009 |
| RU | 2419826 C2 | 5/2011 |
| WO | 200248810 A2 | 6/2002 |
| WO | 2009104036 A1 | 8/2009 |

OTHER PUBLICATIONS

Chinese Office Action issued by the Chinese Patent Office from corresponding Chinese Application No. 201210592712.8 dated Dec. 15, 2015 [Full English Translation attached].
Chinese Second Office Action issued by the Chinese Patent Office from corresponding Chinese Application No. 201210592712.8 dated Aug. 17, 2016 [English Translation attached].
Gong, Yuwei "Course of Web Technology", Shandong University Press, Feb. 28, 2009, pp. 2-7 [English Translation attached].
Russian Office Action issued by the Russian Patent Office from corresponding Russian Application No. 2015131115 dated Sep. 22, 2016 [English Translation attached].
International Search Report from corresponding PCT/CN2013/090259 dated Feb. 13, 2014.
International Preliminary Report on Patentability and Written Opinion of the International Searching Authority from corresponding PCT/CN2013/090259 dated Jun. 30, 2015.

* cited by examiner

PROGRAMMING AUXILIARY SYSTEM OF PROGRAMMABLE CONTROLLER AND METHOD THEREOF

This application is the U.S. National Phase Application under 35 U.S.C. § 371 of International Application No. PCT/CN2013/090259, filed Dec. 23, 2013, which claims priority to Chinese Patent Application No. CN201210592712.8, filed Dec. 31, 2012. These prior applications are incorporated by reference herein in their entirety.

TECHNICAL FIELD

The present disclosure relates to a Programmable Controller (PLC) programming auxiliary system and a method thereof, and more particular, to a PLC programming auxiliary system which is based on a network, easy to use and has a user friendly way, and a method thereof.

BACKGROUND

Traditionally, a user has to install a programming software for programming a PLC on a PC machine at first when he/she wants to program the PLC, and then the installed software for programming the PLC should be executed on the PC machine, in order to program a PLC device. Such a manner to program the PLC has several disadvantages. For example, only the PC machine on which the PLC programming software has been installed can program the PLC, but the installation may fail due to many reasons such as an Operation System or other uncertain factors when the PLC programming software is installed. Also, with an updating and an upgrading of the PLC device, the PLC programming software is also required to be upgraded usually, and the user has to update the software on his/her computer at that time. Because the traditional PLC programming manner is an alone-machine manner based a PC, it causes many inconveniences to the users during the installation, usage and updating of the PLC programming software.

In order to overcome the above disadvantages of the traditional PLC programming manner, it is desired to propose a PLC programming auxiliary system which is easy to use and has a user friendly way, and a method thereof.

SUMMARY

In view of this, the present disclosure provides a PLC programming auxiliary system which is based on a network, easy to use and has a user friendly way, and a method thereof.

As compared with the traditional PLC programming manner, which is the alone-machine manner based on the PC, on any PC having a web browser and a network link, the programming auxiliary system and the method thereof according to embodiments of the present disclosure can use the programming software directly without installing the programming software on the PC, independent of the Operation System and other system components. With the PLC programming auxiliary system and the method thereof, neither is the programming software with a new version needed to be distributed to the different users, nor is the user needed to update the programming software.

According to one aspect of the present disclosure, there is provided a PLC programming auxiliary system comprising: a website server providing a complex algorithm for programming a PLC, a correctness checking of the programming and a user logic compilation functions; a plurality of client computers connecting with a website server and the programmed PLC devices via a network link. Wherein when the user is linked to the website server via the client computer, a web browser on the client computer requests from the website server to download a client programming software for programming a corresponding PLC device, and the client programming software for programming the corresponding PLC device is executed within the web browser on the client computer, to enable the client computer to configure the PLC device and write the user logic through the client programming software for programming the corresponding PLC device, and the client computer implements an interface connection and interaction operations between the website server and the user through the client programming software for programming the corresponding PLC device.

In an example, the website server is provided by a manufacture producing the PLC device.

In an example, functions of the website server 1 are implemented on it with a server script or a programming language like C/C++ and JAVA.

In an example, the client programming software for programming the corresponding PLC device is implemented with a WEB page technology such as HTML, CSS, JavaScript and JAVA applet.

In an example, the website server comprises: a PLC device database including information and parameters of supported PLC device, modules and communication ports, configured to send the information and the parameters to the client software of the website browser on the client computer when it asks for them, for configuring the programmed PLC device; a user logic checker and compiler configured to check grammars of a user logic and compile the user logic, and send a compilation result to the website browser on the client computer back when the user sends the user logic to the website server through the client programming software; a user application database for storing and managing the user logic written by the user, and transferring the stored user logic to the website browser on the client computer when it is asked for; and a client programming software storage for storing the client programming software for programming the PLC device and transferring the stored client programming software to the website browser on the client computer as it is asked for.

In an example, the client computer comprises: a device configurator for configuring the PLC device; a user application manager for managing the user logic; a user logic editor for editing the user logic by the user; a debugger for debugging the user logic online; and a device manager for communicating with the PLC device being programmed.

In an example, the user logic is acquired from the website server or a local file system of the client computer.

According to another aspect of the present disclosure, there is provided a PLC programming auxiliary method comprising: downloading a client programming software for programming a corresponding PLC device from a website server by a website browser on a client computer and executing the same in the website browser; configuring the PLC device and writing a user logic through the downloaded client programming software, by a user, and sending the user logic to the website server; checking and compiling the user logic written by the user, by the website server; sending the compiled user logic back to the website browser on the client computer, by the website server; connecting to the programmed PLC device and downloading the compiled user logic into the programmed PLC device, by the website browser on the client computer; executing the user logic in the programmed PLC device; sending a PLC state back to the website browser on the client computer as an execution result of the user logic, by the programmed PLC device; and monitoring the programmed PLC through the website browser on the client computer, by the user.

BRIEF DESCRIPTION OF THE DRAWINGS

The present disclosure will become more fully understood and apparent for those skilled in the art from the detailed description given hereinafter in connection with the accompanying drawings which are given by way of illustration only, and thus are not limitative of the present disclosure. The spirit and scope of the present disclosure is defined by detailed contents in Claims attached. Below will describe the accompanying drawings briefly and wherein:

DETAILED DESCRIPTION

The embodiments of the present disclosure would be described below by referring to the accompanying drawings.

Figure 1:
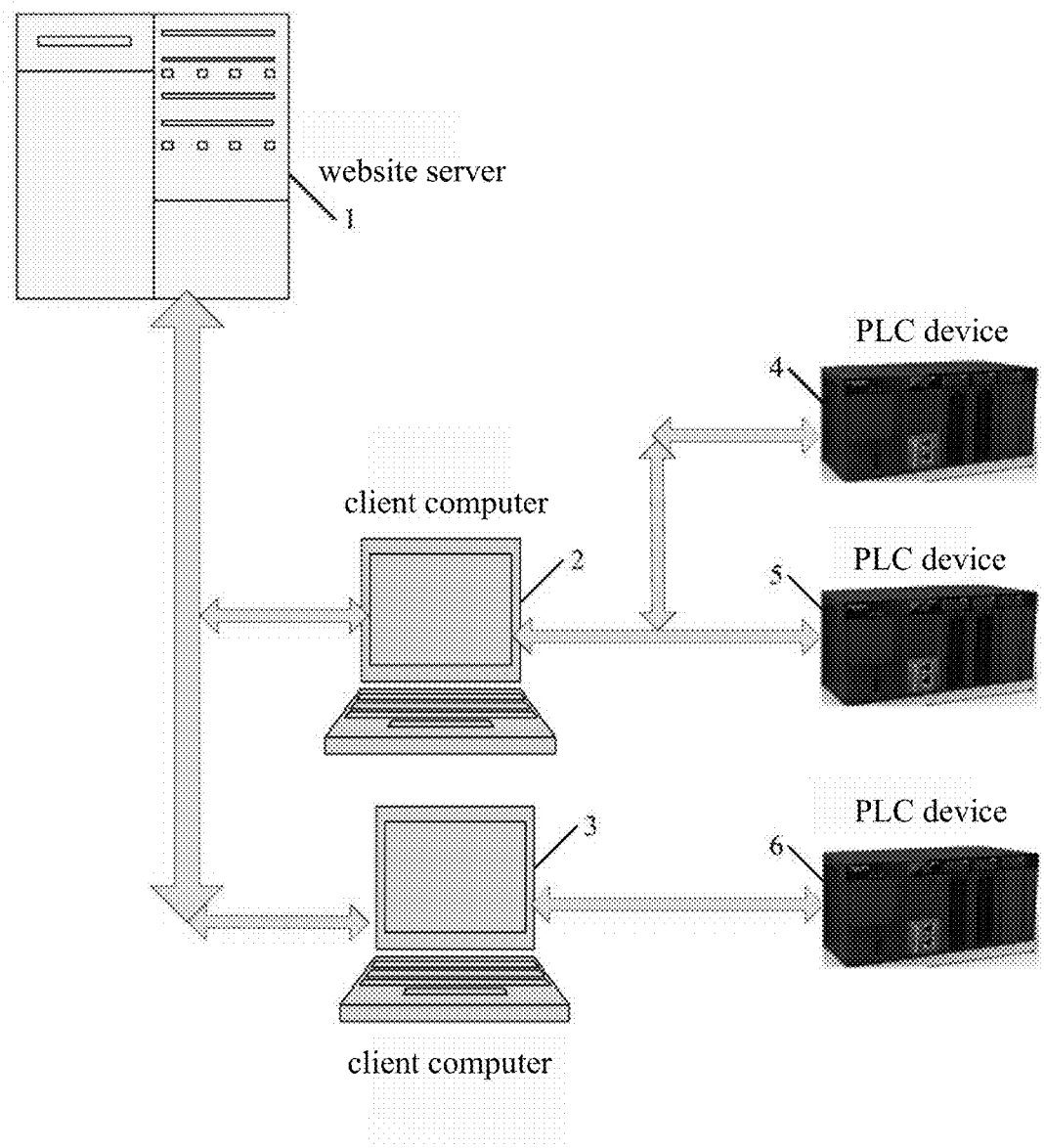
FIG. 1 illustrates an exemplary view of a PLC programming auxiliary system according to embodiments of the present disclosure.

FIG. 1 illustrates a PLC programming auxiliary system according to the embodiments of the present disclosure. In FIG. 1, the PLC programming auxiliary system according to the embodiments of the present disclosure comprises: a website server 1 provided by a manufacture producing a PLC device and a plurality of client computers 2, 3. The website server 1 is linked with the plurality of client computers 2, 3 via a wire or wireless network, and a plurality of programmed PLC devices are connected with their corresponding client computers via the wire or wireless network. In FIG. 1, the PLC devices 4, 5 are connected with the client computer 2 via the network link, and the PLC device 6 is connected with the client computer 3 via the network link.

In FIG. 1, the website server 1 is in charge of providing a complex algorithm for programming a PLC, a correctness checking of the programming and a user logic compilation functions, and the above functions may be implemented on the website server 1 with a server script or a programming language like C/C++ and JAVA.

When the user is linked to the website server 1 via the client computer 2 or 3, a web browser on the c client computer 2 or 3 requests from the website server 1 to download a client programming software for programming a corresponding PLC device, and the client programming software for programming the corresponding PLC device is executed within the web browser on the client computer 2 or 3. The client programming software for programming the corresponding PLC device may be implemented with a WEB page technology such as HTML, CSS, JavaScript and JAVA applet. That is, the client computers 2, 3 configure the PLC devices 4, 5, 6 and write the user logic through the client programming software for programming the corresponding PLC device, and the client computers 2, 3 implement an interface connection and interaction operations between the website server 1 and the user through the client programming software for programming the corresponding PLC device, and in turn realize the programming of the PLC device.

Figure 2:
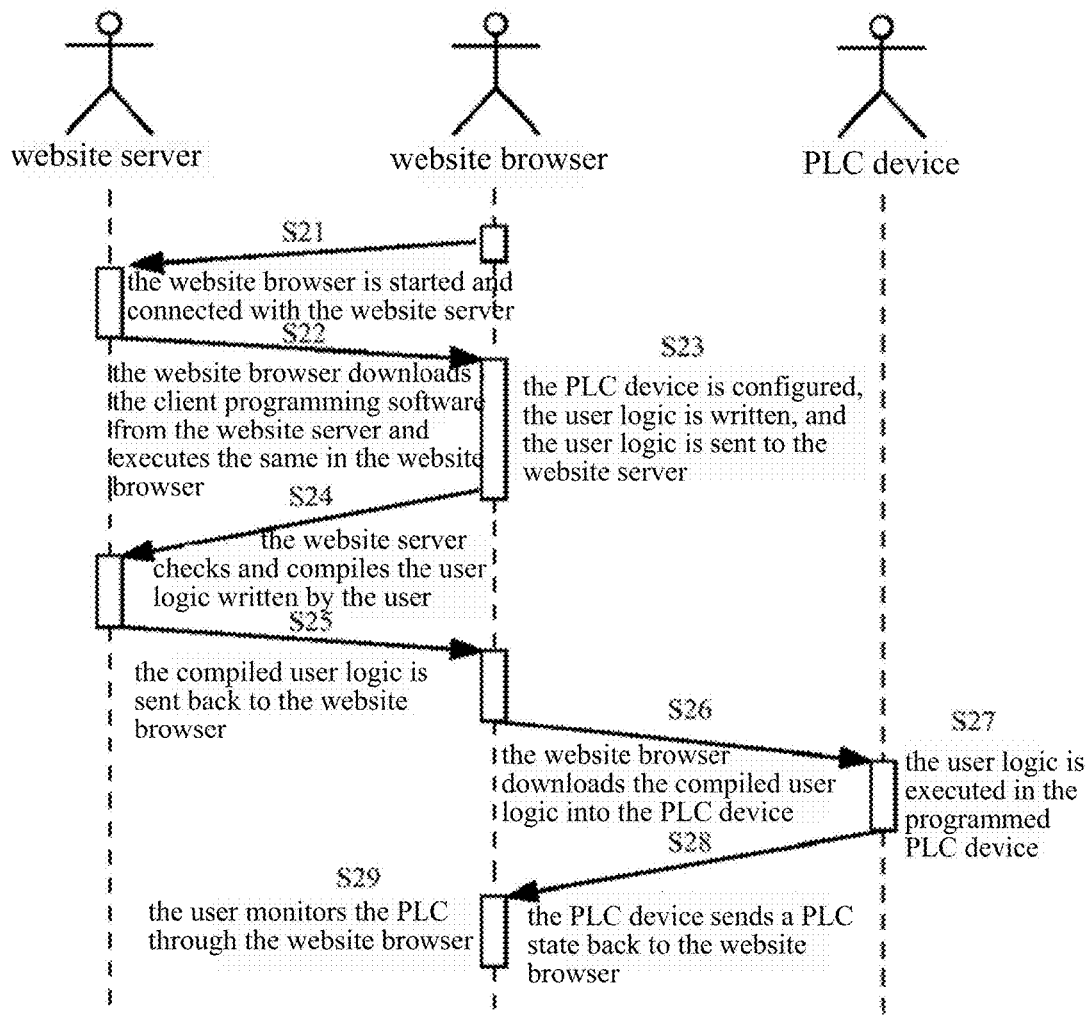
FIG. 2 illustrates a flowchart of a PLC programming auxiliary method according to the embodiments of the present disclosure.

FIG. 2 illustrates a flowchart of a PLC programming auxiliary method according to the embodiments of the present disclosure.

Referring to FIG. 2, like FIG. 1, the website server is linked to the client computer via the wire or wireless network, and the PLC device is connected with the client computer via the wire or wireless network. The PLC programming auxiliary method according to the embodiments of the present disclosure programs the PLC device among the website server, the client computer and the PLC device through operating the website browser on the client computer by the user.

FIG. 2 illustrates one programming process of the PLC device. At step S21, the user opens the website browser on the client computer 2 or 3 and connects it with the website server 1.

At step S22, the website browser on the client computer 2 or 3 downloads the client programming software for programming the corresponding PLC device from the website server 1 and executes the same in the website browser.

At step S23, the user configures the PLC device and writes the user logic through the downloaded client programming software, and sends the user logic to the website server 1.

At step S24, the website server 1 checks and compiles the user logic written by the user.

At step S25, the website server 1 sends the compiled user logic back to the website browser on the client computer 2 or 3.

At step S26, the website browser on the client computer 2 or 3 connects to the programmed PLC device and downloads the compiled user logic into the programmed PLC device.

At step S27, the user logic is executed in the programmed PLC device.

At step S28, the programmed PLC device sends a PLC state back to the website browser on the client computer 2 or 3 as an execution result of the user logic.

At step S29, the user monitors the programmed PLC through the website browser on the client computer 2 or 3.

Figure 3:
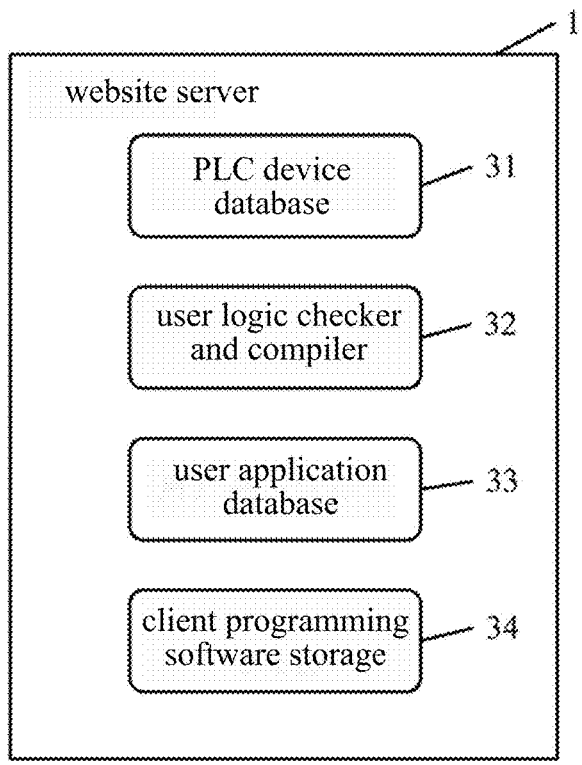
FIG. 3 illustrates a detailed block diagram of a website server in the PLC programming auxiliary system according to the embodiments of the present disclosure.

FIG. 3 illustrates a detailed block diagram of a website server in the PLC programming auxiliary system according to the embodiments of the present disclosure. The website server in the PLC programming auxiliary system according to the embodiments of the present disclosure comprises: a PLC device database 31, a user logic checker and compiler 32, a user application database 33 and a client programming software storage 34.

The PLC device database 31 includes information and parameters of supported PLC device, modules and communication ports. The PLC device database 31 is configured to send the information and the parameters to the client software of the website browser on the client computer 2 or 3 when it asks for them, for configuring the PLC device.

The user logic checker and compiler 32 is configured to check grammars of the user logic and compile the user logic, and send a compilation result to the website browser on the client computer back when the user sends the user logic to the website server through the downloaded client programming software.

The user application database 33 is used for storing and managing the user logic written by the user. Further, the user application database 33 transfers the stored user logic to the website browser on the client computer when it is asked for.

The client programming software storage 34 is used for storing the client programming software for programming the PLC device and transferring the stored client programming software to the website browser on the client computer as it is asked for.

Figure 4:
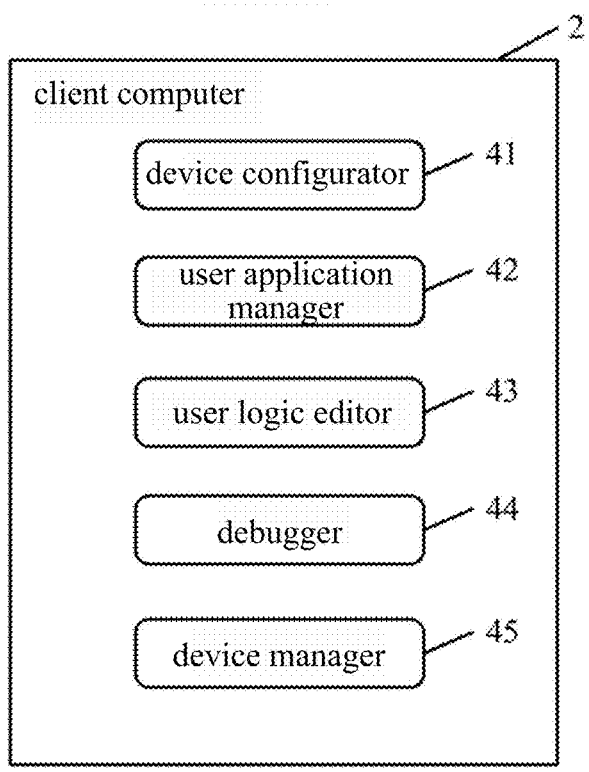
FIG. 4 illustrates a detailed block diagram of a client computer in a state where the PLC programming auxiliary system programs the PLC according to the embodiments of the present disclosure.

FIG. 4 illustrates a detailed block diagram of a client computer in a state where the PLC programming auxiliary system programs the PLC according to the embodiments of the present disclosure. The client computer in the PLC programming auxiliary system according to the embodiments of the present disclosure enters a PLC programming state after it downloads the client programming software for programming the PLC device from the website server, and at this time the client computer may comprise a device configurator 41, a user application manager 42, a user logic editor 43, a debugger 44 and a device manager 45.

The device configurator 41 is used for configuring the PLC device.

The user application manager 42 is used for managing the user logic acquired from the website server or a local file system of the client computer.

The user logic editor 43 is used for editing the user logic by the user.

The debugger 44 is used for debugging the user logic online.

The device manager 45 is used for communicating with the PLC device.

Figure 5:
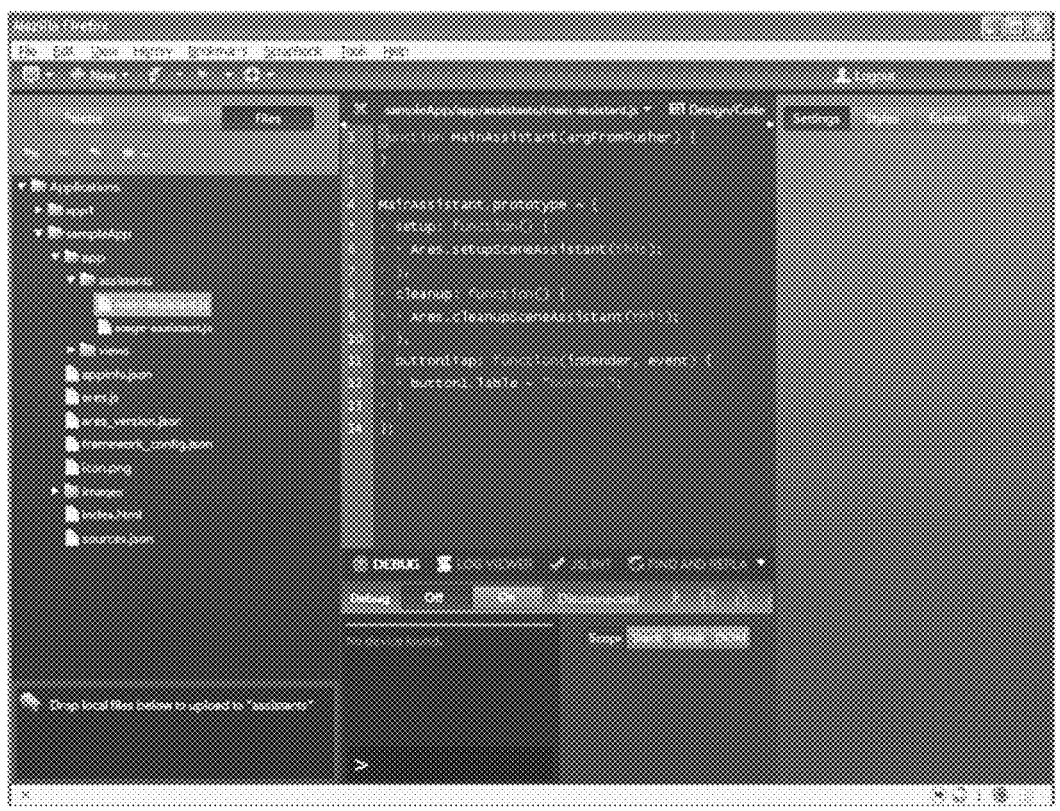
FIG. 5 illustrates an exemplary view of an interface of a client computer in a state where the PLC programming auxiliary system programs the PLC according to the embodiments of the present disclosure.

FIG. 5 illustrates an exemplary view of an interface of a client computer in a state where the PLC programming auxiliary system programs the PLC according to the embodiments of the present disclosure, as an example.

As compared with the traditional PLC programming manner, which is the alone-machine manner based on the PC, on any PC having a web browser and a network link, the programming auxiliary system and the method thereof according to embodiments of the present disclosure can use the programming software directly without installing the programming software on the PC, independent of the Operation System and other system components. With the PLC programming auxiliary system and the method thereof, neither is the programming software with a new version needed to be distributed to the different users, nor is the user needed to update the programming software.

Although the conceivable exemplary embodiments of the present disclosure have been illustrated and described, those skilled in the art can understand that, with the development of technology, various changes and variations can be made on the present disclosure and corresponding element can be replaced with another equivalence without departing from the real scope of the present disclosure.

What is claimed is:

1. A Programmable Logic Controller (PLC) programming auxiliary system comprising:
 a website server configured to:
  provide instructions for programming a PLC, receive user logic, verify the user logic, and compile the user logic to create compiled user logic; and
 a plurality of client computers configured to couple with the website server and a plurality of programmed PLC devices via at least one network link, each of the plurality of client computers having a web browser configured to:
  receive the instructions for programming a PLC;
  receive instructions from a user to create the user logic;
  provide the user logic to the website server;
  receive the compiled user logic; and
  provide the compiled user logic to at least one PLC;
 wherein the website server comprises a PLC device database including information and parameters of supported PLC devices, modules and communication ports, and is configured to send the information and the parameters to the web browser on one of the plurality of client computers for configuring the at least one PLC.

2. The PLC programming auxiliary system of claim 1, wherein the website server is configured to provide programming instructions for a specific manufacturer of PLCs.

3. The PLC programming auxiliary system of claim 1, wherein functions of the website server (1) are implemented using at least one of C/C++ and JAVA.

4. The PLC programming auxiliary system of claim 1, wherein the instructions for programming a PLC are implemented using at least one of HTML, CSS, JavaScript and a JAVA applet.

5. The PLC programming auxiliary system of claim 1, wherein the website server comprises:
 a user logic checker and compiler configured to check a grammar of the user logic and compile the user logic, and send the compiled user logic to the website browser on one of the plurality of client computers;
 a user application database (33) for storing and managing the user logic; and
 a client programming software storage (34) for storing the instructions for programming the PLC and transferring the stored instructions to the website browser on one of the plurality of client computers.

6. The PLC programming auxiliary system of claim 1, wherein at least one of the plurality of client computers is configured to perform the steps of:
 configuring the at least one PLC;
 managing the user logic;
 editing the user logic based on input by the user;
 debugging the user logic; and
 communicating with the at least one PLC.

7. The PLC programming auxiliary system of claim 6, wherein
 the user logic is acquired from the website server or a local file system of one of the plurality of client computers.

8. A Programmable Logic Controller (PLC) programming auxiliary method, comprising:
 downloading client programming instructions for programming a PLC device from a website server and executing the instructions in a website browser on a client computer;
 configuring the PLC device, receiving user logic from a user of the client computer, and sending the user logic to the website server;
 checking and compiling the user logic by the website server;
 sending the compiled user logic back to the website browser;
 downloading the compiled user logic into the PLC device from the website browser on the client computer;
 executing the user logic in the PLC device;

sending a PLC state back to the website browser on the client computer as an execution result of the user logic, by the PLC device; and providing, by the website browser, information indicative of the PLC state;

wherein the website server comprises a PLC device database including information and parameters of supported PLC devices, modules and communication ports, and wherein the method further comprises:

sending the information and the parameters to the website browser on the client computer for configuring the PLC device.

* * * * *